United States Patent
Henry et al.

(10) Patent No.: US 9,225,758 B2
(45) Date of Patent: Dec. 29, 2015

(54) SIMPLIFIED TRANSMISSION METHOD FOR A STREAM OF SIGNALS BETWEEN A TRANSMITTER AND AN ELECTRONIC DEVICE

(75) Inventors: Jean-Baptiste Henry, Melesse (FR); Gaetan Cottereau, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 711 days.

(21) Appl. No.: 12/454,867

(22) Filed: May 26, 2009

(65) Prior Publication Data

US 2009/0290638 A1 Nov. 26, 2009

(30) Foreign Application Priority Data

May 26, 2008 (FR) ...................... 08 53404

(51) Int. Cl.
| | | |
|---|---|---|
| H04N 11/02 | (2006.01) | |
| H04L 29/06 | (2006.01) | |
| H04N 21/234 | (2011.01) | |
| H04N 21/24 | (2011.01) | |
| H04N 21/44 | (2011.01) | |
| H04N 21/6332 | (2011.01) | |
| H04N 21/6336 | (2011.01) | |
| H04N 21/654 | (2011.01) | |

(52) U.S. Cl.
CPC .......... *H04L 65/4076* (2013.01); *H04L 65/607* (2013.01); *H04L 65/608* (2013.01); *H04L 65/80* (2013.01); *H04N 21/23406* (2013.01); *H04N 21/2402* (2013.01); *H04N 21/44004* (2013.01); *H04N 21/6332* (2013.01); *H04N 21/6336* (2013.01); *H04N 21/654* (2013.01)

(58) Field of Classification Search
USPC ................................... 375/240.12
See application file for complete search history.

(56) References Cited

U.S. PATENT DOCUMENTS

| | | | |
|---|---|---|---|
| 5,867,230 | A | 2/1999 | Wang et al. |
| 5,963,202 | A | 10/1999 | Polish |
| 6,014,706 | A | 1/2000 | Cannon et al. |
| 6,188,436 | B1 | 2/2001 | Williams |
| 7,050,202 | B1 | 5/2006 | Nishida |

(Continued)

FOREIGN PATENT DOCUMENTS

| | | |
|---|---|---|
| EP | 1271953 | 1/2003 |
| EP | 1411532 | 7/2004 |

(Continued)

OTHER PUBLICATIONS

European Search Report dated May 8, 2009.

(Continued)

*Primary Examiner* — Dave Czekaj
*Assistant Examiner* — Leron Beck
(74) *Attorney, Agent, or Firm* — Myers Wolin LLC

(57) ABSTRACT

A multimedia data transmission method between a transmitter server and at least one decoder receiver the multimedia data being transmitted by packets in a stream of samples coding images (I, P, B) of variable size, the method includes: determining a same transmission delay for all the samples of the stream, determining a transmission bitrate for each sample enabling the sending of this sample within the determined transmission delay, transmitting each sample from the transmitter server to the decoder receiver while respecting the transmission bitrate specific to this sample and the transmission delay of all the samples.

14 Claims, 3 Drawing Sheets

(56) References Cited

U.S. PATENT DOCUMENTS

| | | | |
|---|---|---|---|
| 2002/0105951 | A1* | 8/2002 | Hannuksela et al. ......... 370/389 |
| 2003/0103243 | A1 | 6/2003 | Watanabe et al. |
| 2004/0184526 | A1 | 9/2004 | Penttila |
| 2005/0100094 | A1* | 5/2005 | Keesman ................. 375/240.12 |
| 2005/0190872 | A1 | 9/2005 | Seong et al. |
| 2006/0218264 | A1* | 9/2006 | Ogawa et al. ................. 709/223 |
| 2007/0002870 | A1 | 1/2007 | Pekonen et al. |
| 2007/0005792 | A1 | 1/2007 | Collet et al. |
| 2007/0011343 | A1 | 1/2007 | Davis et al. |
| 2007/0286279 | A1 | 12/2007 | Hamanaka |

FOREIGN PATENT DOCUMENTS

| | | |
|---|---|---|
| EP | 1581005 | 9/2005 |
| EP | 1845690 | 10/2007 |
| JP | 2000013441 | 1/2000 |
| JP | 2003169090 | 6/2003 |
| JP | 2005229593 | 8/2005 |
| JP | 2007288364 | 11/2007 |
| WO | WO02087235 | 10/2002 |
| WO | WO2004023706 | 3/2004 |
| WO | WO2005022845 | 3/2005 |

OTHER PUBLICATIONS

French Search Report dated Mar. 9, 2009.
Kozlov et al., "Adaptive scheduling of MPEG video frames during real-time wireless video streaming", Proceedings Sixth IEEE international Symposium on a world of wireless Mobile and multimedia Networks, WoWMoM 2005, pp. 460-462.
Rezaei et al., "Video rate control for streaming and local recording optimized for mobile devices", 2005 IEEE 16th international Symposium on Personal, indoor and mobile radio communications, vol. 4, 2005, pp. 2284-2288.
Mansour et al., "Optimal smoothing schedules for real-time streams", Distributed computing, vol. 17, No. 1, Feb. 2004, pp. 77-89.
Lin et al., "FOS: A funnel-based approach for optimal online traffic smoothing of live video", IEEE transactions on multimedia, vol. 8, No. 5, Oct. 5, 2006, pp. 996-1004.
Iskander et al., "Online smoothing of VBR H. 263 video for the CDMA2000 and IS-95B uplinks", IEEE transactions on multimedia, vol. 6, No. 4, Aug. 2004, pp. 647-658.
Ishihara et al., "Predictive rate control for realtime video streaming with network triggered handover", 2005 IEEE Wireless communications and networking conference, vol. 3, 2005, pp. 1335-1340.
Zhihai et al., "Law-pass filtering of rate-distortion functions for quality smoothing in real-time video communication", IEEE transactions on circuits and systems for video technology, vol. 15, No. 8, Aug. 2005, pp. 973-981.
Anastasiadis et al., "Shared-buffer smoothing of variable bitrate streams", Performance Evaluation, vol. 59, No. 1, Jan. 2005, pp. 47-72.
Fitzek et al., "Prefetching protocol for streaming of prerecorded continuous media in wireless environments", Proceedings of the SPIE, The international society for optical engineering, vol. 4526, 2001, pp. 121-129.

* cited by examiner

SIMPLIFIED TRANSMISSION METHOD FOR A STREAM OF SIGNALS BETWEEN A TRANSMITTER AND AN ELECTRONIC DEVICE

This application claims the benefit, under 35 U.S.C. §119 of European Patent Application No. 0853404, filed May 26, 2008.

SCOPE OF THE INVENTION

The present invention relates to a method for the transmission of a signals stream between a transmitter server and an electronic device intended to restore these signals in real time. The electronic device considered is for example a digital television decoder.

The domain of the invention is, generally, that of digital television. The invention will be more specifically described in the scope of decoders receiving a signals stream via the Internet network, decoders that will be described hereafter as IP decoders, but the implementation of the method according to the invention is not restricted to this decoder type.

In the digital television domain, television decoders are used to access a set of television channels that are transmitted with encryption and that are decrypted within the decoder. Television decoders are the interface units between the television signal transmission systems, notably digital television signals in MPEG and DVB format, and the display monitors.

The transmission means that broadcast the television transmissions to these decoders can be standard aerial transmission means, coaxial cables, optical cables, re-transmission satellites serving a region, or the Internet network. The decoder comprises the reception means to receive the transmitted signals and the formatting means to transform the received signals into signals that can be directly applied to the display device command units.

The method according to the invention applies in an advantageous manner to the processing of data, transmitted in signal streams that must be restored in real time, such data are continuously transmitted, in a non-periodical manner, in the signal streams. Generally, continuous restoration, or reading is the principle used for the restoration of television signals on the Internet, such a recovery or restoration principle enables the reading of an audio or video stream as it is being broadcast.

This restoration principle is used for the viewing of television services or for the display of contents accessible on "Video on Demand" (VoD). Such a restoration principle thus opposes diffusion by downloading which requires recuperation of the entire set of data of a video extract before being able to restore it.

In this restoration in a real time context, video data packets (FIG. 1) are transmitted by a server 11 charged with broadcasting them on the Internet network until their reception by IP decoder type reception devices 12, or any other type of audio-video data restoration device connected to the network, for example a mobile terminal such as a telephone or personal assistant.

In this example, each packet 10 codes a multimedia sample such as an audio sequence of determined duration or an image. In the latter case, it is apt to distinguish three distinct image types:
  I images (intra) whose coding does not depend on any other image,
  P images (predictive) whose coding depends on previously received images, and
  B images (bi-predictive) which depend on previously and/or subsequently received images.

TECHNOLOGICAL BACKGROUND OF THE INVENTION

The different images are memorized, after reception, in the electronic device 12 intended to restore them. At minimum, these different images are memorized in a "buffer" memory.

In the case of a specific IPTV stream, the considered memorization time is less than a second. In the other examples, the different components can be memorized in a hard disk type memory module, with a view to being decoded later, the applications associated with this memorization type are not then "real time" type applications.

In order to optimize the operation of the system, the receiver 12 must decode the packets 10 with a bitrate identical to the bitrate of their transmission. In fact, if the transmitter server 11 transmits the packets 10 with a bitrate greater than the decoding bitrate of the receiver 12, the buffer memory of the receiver is saturated by the quantity of packets 10 to be stored while waiting for their decoding. Conversely, if the transmitter transmits packets 10 with a bitrate less than the decoding bitrate of the receiver 12, the buffer memory of this latter remains waiting for data.

Consequently, the transmitter server 11 must transmit packets 10 synchronously with the processing carried out by the decoder 12. To enable this synchronization, it is known in the art to use a protocol known as TS (Transport Stream), that timestamps the information transmitted by means of indicators known as PCRs (Program Clock Reference).

Such a method has the advantage of enabling the transmission of a data stream with a bitrate that is practically constant, shown in FIG. 2. More specifically, the bitrate associated with packets 10 already described is shown in this FIG. 2 according to a time axis 18.

Hence, packet transmission 10 is assured if this fixed bitrate can be assured and maintained in the network during this transmission.

The present invention results from the observation that such a method can lead to restoration delays, also known as presentation, of a sample when its transmission is preceded by the transmission of a large sized sample.

For example, as shown in FIG. 1, a B' image transmitted after an I' image having required a long transmission delay can be received late for its restoration—the image restoration order, represented according to the axis 16, being reversible with respect to their transmission order in the MPEG protocol.

As a result, if the presentation of transmitted images takes place more rapidly than their transmission, particularly following the transmission of a large sized image, the decoder 12 ends by remaining in waiting for a B' image for a delay period represented by the shaded area.

GENERAL DESCRIPTION OF THE INVENTION

It is a purpose of the invention to overcome the problem which has just been referred to. For this reason, the invention essentially relates to a transmission method, via a communications network using a packet data transmission protocol, of a stream of multimedia samples intended to restore these data in real time, this stream of samples coding images of variable size, characterized in that the method comprises notably different steps consisting in:
  determining a same transmission delay for all the samples of the stream, determining a transmission bitrate for each sample enabling the sending of this sample within the determined transmission delay, transmitting each sample from the transmitter to the receiver while respecting the transmission bitrate specific to this sample and the transmission delay of all the samples.

In addition to the main characteristics mentioned above, the method according to the invention can also present one or more of the additional characteristics below, considered individually or according to all technically possible combinations:

the steps to set a maximal transmission bitrate of samples from the transmitter server and then to allocate a plurality of transmission delays for the sending of an image, the step to indicate to the decoder receiver the number of transmission delays required for the sending of an image, the step to test the transmission bitrate accessible to the transmitter server via the transmission network, the step to process data relating to television signals, the step to code data according to the MPEG protocol, the step to transmit packets according to the IP protocol.

BRIEF DESCRIPTION OF THE FIGURES

Other characteristics and advantages of the invention will clearly emerge from the description provided below as a non-restrictive example, with reference to the different annexed figures that show.

DESCRIPTION OF THE PREFERRED EMBODIMENTS OF THE INVENTION

The elements appearing on the different figures conserve, unless otherwise specified, the same references.

Figure 1:
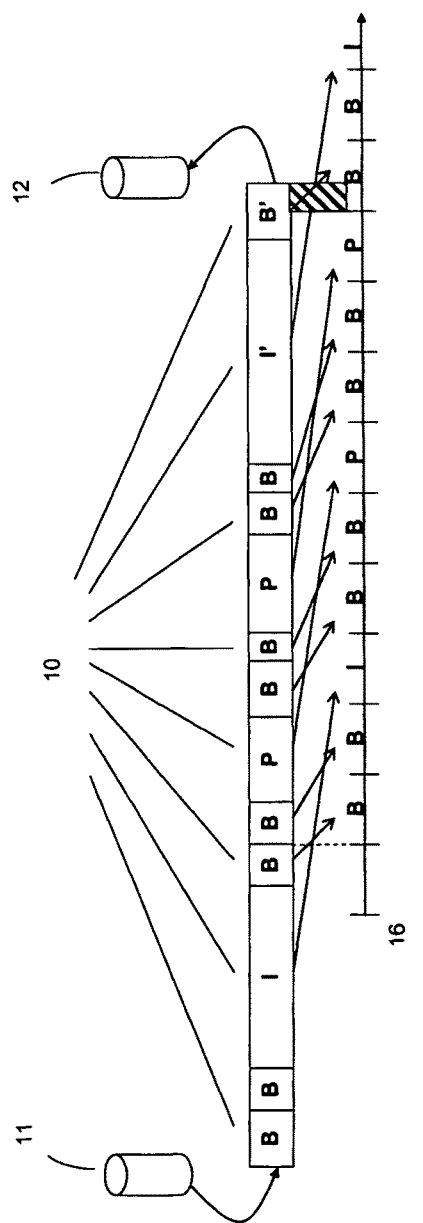
in FIG. 1, already described, a diagrammatic representation of a method for the transmission and restoration of video images according to the prior art, in FIG. 2, already described, a diagram of the transmission bitrate variation of a transmitter server according to the prior art, in FIG. 3 a first diagrammatic representation of a method for transmission and restoration of video images in a first example of implementation of the method according to the invention, in FIG. 4, a diagram of the transmission bitrate variation of a transmitter server in the first example of implementation of the method according to the invention, in FIG. 5 a second diagrammatic representation of a method for transmission and restoration of video images in a first example of implementation of the method according to the invention, and in FIG. 6, a diagram of the transmission bitrate variation of a transmitter server in a second example of implementation of the method according to the invention.
Figure 2:
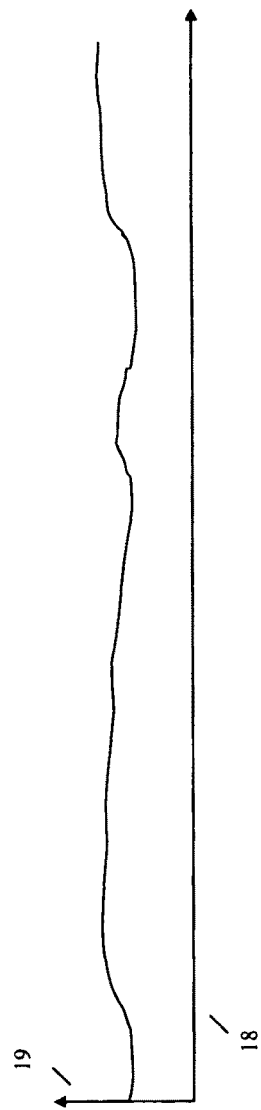
Figure 3:
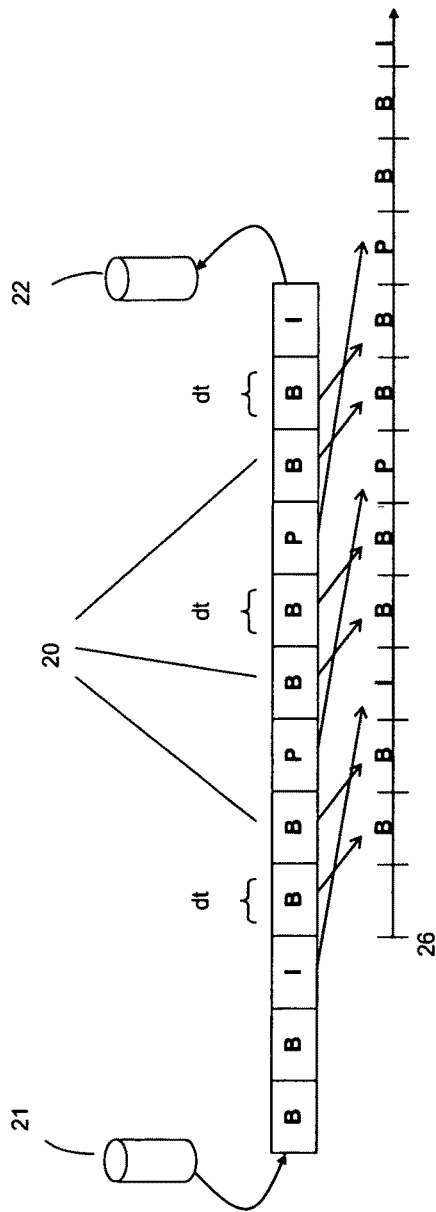

With reference to FIG. 3, a method for transmission and restoration of video images according to a first example of implementation of the invention is represented diagrammatically.

More specifically video data packets 20 are transmitted by a server 21 charged with broadcasting these packets 20 on the Internet network until their reception by IP decoder type reception devices 22, or any other type of audio-video data restoration device connected to the network for example a mobile terminal such as a telephone or personal assistant.

In this example, each packet 20 codes a multimedia sample such as an I, P or B image, each packet 20 being transmitted according to a same predetermined transmission delay dt. In this embodiment, this transmission delay is set at 40 ms in order to attain a bitrate of 25 samples per second.

In other words; a large sized I image is transmitted in this same delay dt as a P or B image of lesser size, the server 21 adapts its transmission bitrate to transmit each image in their set delay dt.

Figure 4:
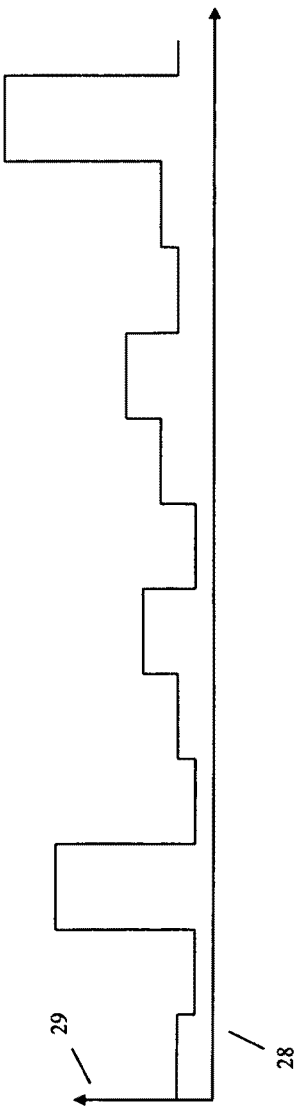

Thus, as shown in FIG. 4, the transmission bitrate 29 varies strongly from an I image (high bitrate) to a P image (medium bitrate) or a B image (low bitrate). As an example and considering an MPEG2 stream at 3.5 Mbps, an I image can have a bitrate of 10 Mbps, a P image a bitrate of 4 Mbps and a B image a bitrate of 1 Mbps.

These bitrate variations have the advantage of enabling the transmission of packets 20 without the nature of the images, particularly the I images of large size, leading to a delay in the image presentation subsequently transmitted to a large sized image.

Indeed, as shown on the axis 26 of FIG. 3, the presentation of images is automatically carried out within the dt delay allotted to each image, this dt delay being identical to the presentation delay of each image.

However, the implementation of this first embodiment of the invention can be limited in a network where the bitrate available to the transmitter server 21 is also limited. Indeed, the physical characteristics of a network can block access, for a server, to the bitrate required for the transmission of a packet 20 in the set delay dt.

Figure 5:
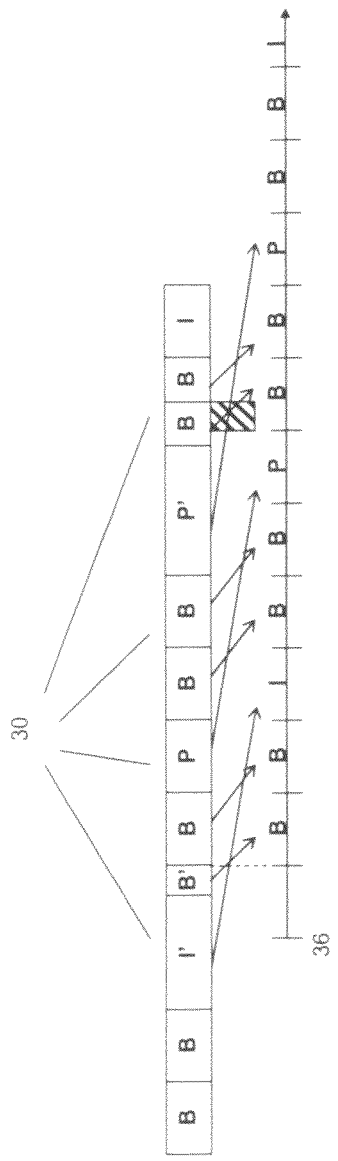

In this case, the transmission of an image of large size exceeds the transmission dt delay. Two situations, shown in FIG. 5 using I' and P' images, are therefore to be considered:

Either the I' image is followed by a B' image so the transmission can be carried out within the reduced transmission dt delay of the timeout relative to the transmission of the I' image. In this case, the timeout for the transmission of the I' image is compatible with the previously described embodiment of the invention.

Or the P' image is followed by a B" image so the transmission cannot be carried out within the reduced transmission dt delay of the timeout relative to the transmission of the P' image. In this case, the timeout for the transmission of the P' image is not compatible with the embodiment of the invention previously described as it would result in retarding for a delay (shaded area) the restoration of this B" image.

Figure 6:
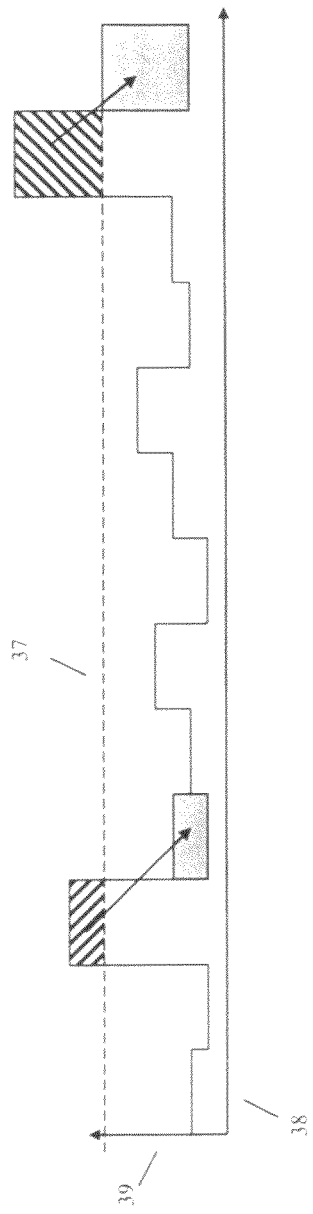

To overcome this latter situation, it is then possible to automatically limit the bandwidth available to the transmitter server as shown in FIG. 6.

By imposing such a limit 37, the server 21 can allocate new transmission dt delays to transmit the part of an image that could not be transmitted within the first dt delay.

In FIG. 6, the data that could not be transmitted within the transmission dt delay are shown with shading, the new dt delay allocated to transmit this data continuing to be represented in grey.

The invention claimed is:

1. A method for transmission, by a transmitter server via a communications network using a packet data transmission protocol, of a stream of multimedia samples, said stream being composed of samples of intra, predictive and bi-predictive coding images (I, P, B) of variable size, wherein the method comprises:

allocating a same transmission delay (dt) for each sample of the stream, said transmission delay corresponding to a presentation delay of each image, setting a maximum transmission bitrate of samples, for each first sample:
    determining a transmission bitrate specific to said first sample enabling the sending of said first sample within said allocated transmission delay (dt),
when said determined transmission bitrate is inferior to said maximum transmission bitrate, transmitting said first sample while respecting said determined transmission bitrate and said allocated transmission delay (dt) of all the samples;
when said determined transmission bitrate exceeds said maximum transmission bitrate:
    transmitting a first part of said first sample while respecting said maximum transmission bitrate and said allocated transmission delay (dt);
    when the transmission of a second sample following said first sample can be carried out in a delay equal to said allocated transmission delay reduced by the timeout relative to the transmission of a second part of said first sample that has not been transmitted during the transmission delay allocated to said first sample, using the transmission delay allocated to said second sample for the transmission of said second part of said first sample.

2. The method according to claim 1, wherein, when said determined transmission bitrate exceeds said maximum transmission bitrate and the transmission of said second sample following said first sample cannot be carried out in a delay equal to said allocated transmission delay reduced by the timeout relative to the transmission of a second part of said first sample that has not been transmitted during the transmission delay allocated to said first sample, said method further comprises:
    allocating at least another transmission delay for the sending of said second part of said first sample.

3. The method according to claim 2, further comprising the transmitter server indicating the plurality of transmission delays allocated for the sending of a sample.

4. The method according to claim 3, further comprising testing the transmission bitrate available via the network between said transmitter server and an electronic receiver-decoder device.

5. The method according to claim 1, wherein said data are related to television signals, and the method further comprising processing said data.

6. The method according to claim 1, further comprising coding the images according to a protocol compliant with an MPEG standard protocol.

7. The method according to claim 1, wherein the transmitting each sample uses a packet transmission protocol compliant with IP protocol.

8. A server intended to be connected to a communications network using a packet data transmission protocol for the transmission of a stream of multimedia samples, said stream being composed of samples of intra, predictive and bi-predictive coding images (I, P, B) of variable size, comprising a transmitter configured for:
    allocating a same transmission delay (dt) for each sample of the stream, said transmission delay corresponding to a presentation delay of each sample,
    setting a maximum transmission bitrate of samples;
    for each first sample:
        determining a transmission bitrate specific to said first sample enabling the sending of said first sample within said allocated transmission delay (dt),
        when said determined transmission bitrate is inferior to said maximum transmission bitrate, transmitting said first sample while respecting said determined transmission bitrate specific to this sample and said transmission delay (dt);
        when said determined transmission bitrate exceeds said maximum transmission bitrate:
            transmitting a first part of said first sample while respecting said maximum transmission bitrate and said allocated transmission delay (dt);
            when the transmission of a second sample following said first sample can be carried out in a delay equal to said allocated transmission delay reduced by the timeout relative to the transmission of a second part of said first sample that haven't been transmitted during the transmission delay allocated to said first sample, using the transmission delay allocated to said second sample for the transmission of said second part of said first sample.

9. The server according to claim 8, wherein said transmitter is configured for allocating at least another transmission delay for the sending of said second part of said first sample, when said determined transmission bitrate exceeds said maximum transmission bitrate and the transmission of said second sample following said first sample cannot be carried out in a delay equal to said allocated transmission delay reduced by the timeout relative to the transmission of a second part of said first sample that has not been transmitted during the transmission delay allocated to said first sample.

10. The server according to claim 8, wherein said transmitter is configured for indicating the plurality of transmission delays allocated for the sending of a sample.

11. The server according to claim 8, wherein said transmitter is configured for testing the transmission bitrate available via the network between said transmitter server and an electronic receiver-decoder device.

12. The server according to claim 8, wherein said data are related to television signals, and the method further comprising processing said data.

13. The server according to claim 8, wherein said transmitter is configured for coding the images according to a protocol compliant with an MPEG standard protocol.

14. The server according to claim 8, wherein said transmitter is configured for transmitting each sample by using a packet transmission protocol compliant with IP protocol.

* * * * *